Patented Mar. 22, 1938

2,111,552

UNITED STATES PATENT OFFICE 2,111,552

PROCESS FOR THE PREPARATION OF DISPERSIBLE SULPHUR

Arthur D. Chambers and John H. Sachs, Wilmington, Del., assignors to E. I. du Pont de Nemours & Company, Wilmington, Del., a corporation of Delaware No Drawing. Application September 22, 1936, Serial No. 102,055

7 Claims. (Cl. 252—6)

This invention relates to dispersible sulphur and to processes for preparing the same.

This invention has for an object the production of new compositions of matter and new chemical and/or physical processes. Further objects are the preparation of dispersible sulphur, the preparation of dispersible sulphur in high concentrations, and the rapid preparation of dispersible sulphur. A still further object is the preparation of dispersible sulphur which may be used as a fungicidal composition. Still further objects are the preparation of dispersible sulphur in commercial quantities, and in general an advancement of the art. Other objects will appear hereinafter.

These objects are accomplished by the following invention which comprises agitating a mixture of molten sulphur and a water-soluble organic non-electrolyte at a temperature below about 150° C., with cooling, until the mass freezes to such an extent that there is no separation of layers upon standing. The product is further cooled and comminuted. All crystalline forms of sulphur may be used.

The invention will be further illustrated, but is not intended to be limited by the following examples, in which the quantities are stated in parts by weight.

Example I

Eighty (80) parts of sulphur were melted in a suitable vessel and heated to a temperature of 140° C. Seventeen (17) parts of pulverized cane sugar were then stirred in thoroughly, keeping the temperature between 130° and 140° C. The liquid became quite plastic and changed from the clear yellow color of molten sulphur to a lighter yellow opaque mass. The stirring was continued until a homogeneous mixture was obtained, whereupon it was allowed to cool and harden. It was then ground by any of the well known means with the addition of 3 parts of sodium dinaphthyl-methane-disulfonate until the powder passed through a 200-mesh screen. The product thus obtained, when thrown on water, immediately sank through the water and was dispersed to yield an almost white homogeneous liquid of dispersed sulphur.

Example II

Seventy (70) parts of sulphur were melted in a suitable vessel and the temperature was raised to 140° C. At this temperature 28 parts of dry glucose were added, the temperature being maintained between 130° and 140° C. The mixture was stirred until it became homogeneous. It changed from the clear yellow color of molten sulphur to a lighter yellow opaque mass. It was then allowed to cool and harden, and was then ground by an ordinary means with the addition of 2 parts of commercial dodecyl sulphate (which also contains alkyl sulphates having ten to sixteen carbon atoms) until the resulting powder passed through a 200-mesh screen. The product upon its addition to water sank and dispersed very readily to an almost white suspension of colloidal sulphur.

Example III

One hundred eighty (180) parts of ordinary sulphur were melted in an iron container and the temperature was carried to 135° C. At this point 16 parts of confectionery sugar were stirred in. The temperature was allowed to drop as stirring proceeded, and it was noted that as soon as stirring ceased the sugar tended to separate as a layer on top of the mass. It was therefore necessary, in order to get a homogeneous mixture, to continuously stir until the temperature dropped to 117°–114° C. At this temperature the mass began to congeal, and as it congealed the mass was kept homogeneous by vigorous stirring. When stirring was no longer possible with an ordinary wooden paddle, the mass had reached a taffy-like consistency and the sugar no longer separated. It was then poured on a stone surface and allowed to harden.

The product so obtained was ground with 4 parts of sodium isopropylnaphthalenesulfonate through a colloid mill to a particle size of about 5 microns. It was then ready for incorporation into ordinary spraying mixtures by well known means.

Dispersible sulphur may be prepared by following procedures similar to those described in the examples. Thus, the temperature may be varied over quite a range, e. g., from the melting point of sulphur to the temperature just below that at which appreciable reaction between the carbohydrate and the water-soluble organic non-electrolyte occurs, i. e., from 114° C. or below to 150° C.

When sulphur is melted, it passes through several states. The first is a low-viscosity state. This is followed by a thickening at a temperature above about 150° C. If the heating is continued, the sulphur becomes thin again (around 250°–300° C.) and remains in this second low-viscosity state to its boiling point (about 400° C.).

For the application of the present invention, the sulphur is employed in its first low-viscosity state. For this purpose, the temperature at normal pressure is preferably at least about 110° C. but not substantially greater than 140° C. The preferred temperature conditions after the sulphur has been melted and the sugar has been added are between 117° C. and 114° C. This temperature range forms an important feature of the present invention since a homogeneous mass may be obtained. At temperatures slightly above 117° C., the mixture of sugar and molten sulphur begins to congeal and separates into two layers. However, if stirring is continued until a temperature of 117° C. and approaching 114° C. is obtained, separation no longer occurs and a homogeneous product is obtained. This phenomenon is somewhat surprising in view of the fact that the melting point of monoclinic sulphur is about 119.25° C.

At temperatures materially above 150° C. (viz., at about 160° C.) a reaction between the water-soluble carbohydrate and sulphur occurs. The reaction products are undesirable in dispersible sulphur compositions. Hence, such conditions are to be avoided by the present invention. The proportions of sulphur to non-electrolyte may be varied widely. We prefer at least about two parts of sulphur to one part of non-electrolyte.

In place of the cane sugar and glucose of the examples, other water-soluble organic non-electrolytes may be used, e. g., dextrine, dextrose, soluble starch, and the like.

In place of sodium dinaphthylmethanedisulphonate, crude dodecyl sulphate and sodium isopropylnaphthalenesulphonate, wetting agents in general may be used, e. g., sulphonates of substituted naphthalenes containing alkyl or other hydrocarbon radicals of at least three carbon atoms, such as propyl; benzyl; butyl; naphthalene mono- and polysulphonates, sulphates and sulphonates of long chain aliphatic alcohols, and sulphated or sulphonated derivatives of such acids, such as ethers of mono- and polyhydroxy aliphatic hydrocarbons and esters, sodium salt of 9, 10-octadecenyl acetate sulphonate, sodium salts of sulphonated fatty acid amides, sulphonated oils, diethylcyclohexylamine, dodecyl sulphate, N - octadecylbetaine, trimethyloctadecylammonium bromide, cetylpyridinium bromide, triethanolamine oleate, etc. The sulphonated wetting agents are preferred for the reason that they give improved products.

The invention described herein has the advantage that a uniform, readily dispersible sulphur composition in finely divided form is produced. The product has great utility in the arts which require a readily dispersible stable product. The composition is particularly valuable as an efficient fungicidal dust. When brought into contact with the moisture of the plant, it is readily wetted. The dispersible sulphur product produced according to this invention sinks readily in water and, therefore, has special utility in the preparation of spray solutions. Since it is readily dispersible in water, it is possible to obtain aqueous solutions of widely varying concentrations. The colloidal solutions are quite stable and settle slowly upon standing. The dispersions can be quickly renewed after long standing by shaking slightly. Other fungicides and insecticides may be incorporated in such spray solutions without affecting the dispersibility of the sulphur. In fact, where the fungicides or insecticides to be used are insoluble, the sulphur product of this invention aids in the dispersing of the aforementioned insoluble components.

The products of this invention have the additional advantage that substantially all of the sulphur is present as elemental sulphur. Thus, the product is substantially free from organic sulphur compounds.

It will be apparent to those skilled in the art that many widely different embodiments of this invention may be made without departing from the spirit and scope thereof. It is to be understood that we do not limit ourselves to the specific embodiments thereof except as defined in the appended claims.

We claim:

1. The process which comprises agitating a mixture of molten sulphur and a solid water-soluble organic non-electrolyte at a temperature above the melting point of sulphur and below that at which appreciable reaction between the organic substance and sulphur occurs.

2. The process which comprises agitating a mixture of molten sulphur and a solid water-soluble organic non-electrolyte at a temperature below about 150° C. with cooling until the mass freezes to such an extent that there is no separation of layers upon standing.

3. The process which comprises agitating a mixture of molten sulphur and a solid water-soluble carbohydrate at a temperature between about 120° C. and about 150° C., cooling with agitation until separation of layers no longer occurs, and comminuting the resulting product.

4. The process which comprises heating sulphur to a temperature of about 130° C. to about 140° C., adding a solid water-soluble carbohydrate, with agitation, and cooling until the mass freezes to such an extent that there is no separation of layers upon standing, and comminuting the solid product.

5. The process which comprises heating sulphur to a temperature of about 135° C., adding solid sugar with agitation and cooling until the temperature reaches between 117° C. to 114° C., further agitating until a taffy-like consistency is obtained, further cooling and comminuting the solid product.

6. The process which comprises heating sulphur to a temperature of about 130° C. to about 140° C., adding solid soluble starch with agitation and cooling until the mass freezes to such an extent that there is no separation of layers upon standing and comminuting the solid product.

7. The process which comprises heating sulphur to a temperature of about 130° C. to about 140° C., adding solid glucose with agitation and cooling until the mass freezes to such an extent that there is no separation of layers upon standing and comminuting the solid product.

ARTHUR D. CHAMBERS.
JOHN H. SACHS.